C. W. HODGES.
GRIP CHAIN FASTENER.
APPLICATION FILED JUNE 1, 1915.

1,220,847.

Patented Mar. 27, 1917.

Inventor
Chauncey W. Hodges
By
Attorney

UNITED STATES PATENT OFFICE.

CHAUNCEY W. HODGES, OF GRAND RAPIDS, MICHIGAN.

GRIP-CHAIN FASTENER.

1,220,847.  Specification of Letters Patent.  Patented Mar. 27, 1917.

Application filed June 1, 1915. Serial No. 31,611.

*To all whom it may concern:*

Be it known that I, CHAUNCEY W. HODGES, a citizen of the United States, residing at Grand Rapids, in the county of Kent and State of Michigan, have invented certain new and useful Improvements in Grip-Chain Fasteners, of which the following is a specification.

My invention relates to improvements in appliances for securing grip chains to automobile wheels, and its objects are: first, to provide a means whereby the chains may be so secured to the spokes of the wheels that it will be impossible for them to shift from their positions; second, to provide a fastening to the spoke that will not in any manner mar the finish of the spoke; third, to provide a grip chain fastening that cannot be accidentally unlocked from around the spoke when the grip chain is properly secured in place on the wheel; fourth, to provide a means whereby the grip chain may be readily and closely secured in place around the wheel and readily adjusted to the desired tension around the wheel laterally, and, fifth, to provide a ready means for securing, and removing the grip chains from the wheel.

Figure 1:
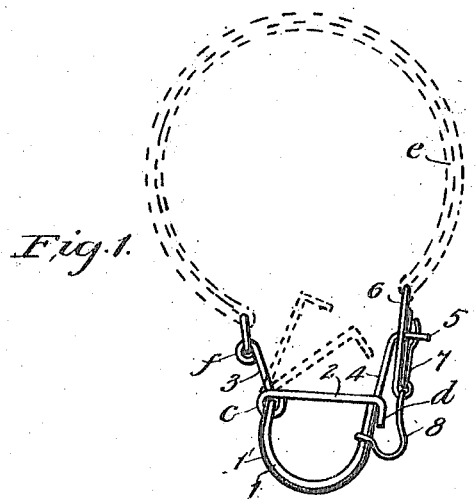
Figure 2:
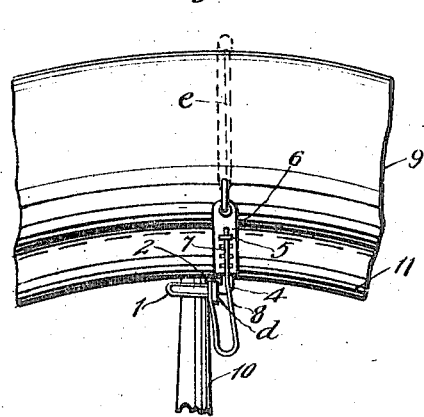
Figure 3:
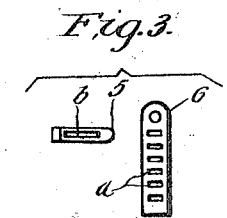
Figure 4:
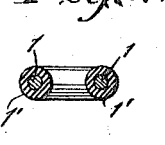

I attain these objects by the mechanism and construction of parts illustrated in the accompanying drawing, in which Figure 1 is a perspective of my fastening device with the grip chain shown in outline; Fig. 2 is a side view of a piece of wheel rim showing how my device is applied, Fig. 3 is a front view of the hasp, and a top view of the tongue at the upper end of one of the arms of the securing device showing how they are constructed, and Fig. 4 is a sectional end view of the bow that engages the spoke, showing a protecting shield thereon.

Similar characters refer to similar parts throughout the several views.

In the drawing 9 represents a piece of an automobile wheel rim and tire, 10 represents its supporting spoke, and e represents an outline of the grip chain showing its position on the wheel and its connection with the securing device. The securing device consists of a metallic frame formed as indicated by the parts 1, 3 and 4. The part 1 is a metal bow, preferably covered with some flexible material, as rubber tubing, as indicated at 1' in Figs. 1 and 4, to protect the surfaces of the spokes, and the rim, from being marred by the action of the bow upon them. This bow is designed to pass around the spoke, and is provided with integral diverging arms 3 and 4 which extend upward around the rim 11 and are connected with the ends of the grip chain e. The bow 1 is firmly secured to the spoke by means of the latch 2, one end of which is pivotally connected with the arm 3, as at c, and the other end is provided with a hook, as d, that is designed to engage the arm 4, as shown in Fig. 1 and indicated in Fig. 2.

The arm 3 is provided with a means, as at f, for pivotally securing the arm to the end of the chain e, as indicated in Fig. 1. The other arm, 4, has the end 5 bent practically at right angles with the arm and provided with a slot, as b, so it may be passed through the slots a a in the hasp 6 and there secured by any available form of key or cotter pin, as 7, passing through the slot b outside of the hasp, as indicated in Fig. 1. I prefer that the cotter pin 7 be connected with the holder or fastening 1 by means of a thong, chain, or other device, as 8, so it will not be likely to become misplaced when the grip chains are removed from the wheel.

To place this fastener on a wheel, the tongue 2 is thrown upward and backward, as indicated by its dotted outline in Fig. 1, until the bow 1 can be placed around the spoke 10. This must be done far enough from the rim 11 of the wheel so the tongue 2 may be swung down in place to lock the bow to the spoke, as in Fig. 2, and then the bow is slid outward toward the rim 11, the chain carried around the rim and tire and the whole drawn as tightly around the wheel as desired when the end 5 of the wing 4 is passed through the desired slot a in the hasp 6 and secured in place by the cotter pin 7, as hereinbefore stated. If it is desired to bind the chain extremely tight around the wheel it is well to exhaust enough of air to reduce the diameter of the tire 9 sufficiently so that when the chain is placed and air again pumped into the tire the expansion of the tire will tighten the chain so closely on the tire as to render it actually rigid and much more firmly seated than would be possible if the chain is placed upon an inflated tire and tightened by simply drawing it as tightly as possible around the tire and rim.

It will be readily understood that with this form of chain, and this means of securing it to the wheel, it will not be necessary to raise the wheel from the ground to apply the chains, and that any person, man or woman, can readily secure the chain onto, or remove it from a wheel without the necessity of using a lifting jack or other means for raising the wheel from the ground.

What I claim as new, and desire to secure by Letters Patent of the United States, is:

In an appliance for securing grip chains on automobile wheels, a metal bow formed to pass over the spoke from one side, the ends of the bow bent at right angles to form integral arms, said arms diverging from each other and formed to fit the outer surface of the wheel rim, a latch pivotally connected with one end of the bow and arranged to hook over the other end of the bow near the bend for the arms, and means for properly securing the ends of the arms to the ends of the grip chain.

Signed at Grand Rapids Michigan May 28 1915.

CHAUNCEY W. HODGES.

Copies of this patent may be obtained for five cents each, by addressing the "Commissioner of Patents, Washington, D. C."